US008133012B2

(12) United States Patent  
Nagai et al.

(10) Patent No.: US 8,133,012 B2
(45) Date of Patent: Mar. 13, 2012

(54) TRANSONIC AIRFOIL AND AXIAL FLOW ROTARY MACHINE

(75) Inventors: Naonori Nagai, Takasago (JP); Junji Iwatani, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 436 days.

(21) Appl. No.: 12/447,951

(22) PCT Filed: Sep. 11, 2007

(86) PCT No.: PCT/JP2007/067645
§ 371 (c)(1),
(2), (4) Date: Apr. 30, 2009

(87) PCT Pub. No.: WO2008/053635
PCT Pub. Date: May 8, 2008

(65) Prior Publication Data
US 2010/0068064 A1  Mar. 18, 2010

(30) Foreign Application Priority Data

Nov. 2, 2006  (JP) .................................. 2006-298841

(51) Int. Cl.
*F01B 25/02* (2006.01)
(52) U.S. Cl. ..................... 415/150; 415/149.1; 416/228; 416/223 A; 416/238; 416/242
(58) Field of Classification Search .................. 415/150, 415/151, 152.2, 149.1, 70, 60; 416/228, 416/223 A, 242, 238
See application file for complete search history.

(56) References Cited

U.S. PATENT DOCUMENTS

| 5,064,345 | A | * | 11/1991 | Kimball ..................... 416/169 A |
| 5,249,921 | A | * | 10/1993 | Stueber et al. ................. 415/138 |
| 5,642,985 | A | | 7/1997 | Spear et al. |
| 6,071,077 | A | * | 6/2000 | Rowlands ................. 416/223 A |
| 6,328,533 | B1 | | 12/2001 | Decker et al. |
| 6,331,100 | B1 | | 12/2001 | Liu et al. |

FOREIGN PATENT DOCUMENTS

| JP | 7-224794 A | 8/1995 |
| JP | 9-184451 A | 7/1997 |
| JP | 2001-193692 A | 7/2001 |
| JP | 2001-214893 A | 8/2001 |

OTHER PUBLICATIONS

International Search Report of PCT/JP2007/067645, date of mailing Oct. 9, 2007.

* cited by examiner

*Primary Examiner* — David Nhu
(74) *Attorney, Agent, or Firm* — Westerman, Hattori, Daniels & Adrian, LLP

(57) ABSTRACT

Sectional profiles close to a tip 124 and a part between a midportion 125 and a hub 123 are shifted to the upstream of an operating fluid flow in a sweep direction. Accordingly, an S shape is formed in which the tip 124 and the part between the midportion 125 and the hub 123 protrude. As a result, it is possible reduce various losses due to shook, waves, thereby forming a transonic airfoil having an excellent aerodynamic characteristic.

8 Claims, 14 Drawing Sheets

12a

12x

TRANSONIC AIRFOIL AND AXIAL FLOW ROTARY MACHINE

This application is a 371 of international application No. PCT/JP2007/067645 filed on Sep. 11, 2007, and claims priority of Japanese application No. 2006-298841, filed on Nov. 2, 2006.

TECHNICAL FIELD

The present invention relates to a transonic airfoil operating in a transonic or supersonic flow region and an axial flow rotary machine such as a turbine having the transonic airfoil, and more particularly, to a transonic airfoil having a three-dimensional shape and an axial flow rotary machine having the transonic airfoil.

BACKGROUND ART

In axial flow rotary machines such as a gas turbine, an aircraft fan engine, and an aircraft jet engine, losses generated in an airfoil cascade can be roughly classified into profile loss due to airfoil shape itself and secondary loss due to fluid flowing between the airfoil cascades. A rotor airfoil suppressing a secondary flow in a solid wall boundary layer generating in an airfoil surface by arranging a higher position of a leading edge is upstream in the axial direction from a lower position is suggested as an airfoil to reduce the secondary loss (see Patent Document 1). The axial direction in this specification represents an axial direction of a rotor around which airfoils are arranged and the radial direction represents a radial direction of the rotor. Profile loss is reduced by constructing a three-dimensional airfoil.

A transonic airfoil operating by a transonic or supersonic operating fluid may be used as the rotor airfoil. In an axial flow rotary machine having the transonic airfoils and operating by the transonic or supersonic operating fluid, a shook wave is generated due to the compressibility of the operating fluid and various losses such as profile loss and secondary loss are caused. That is, a loss due to the shock wave itself, a loss due to interference of the shock wave with the solid wall boundary layer, and a loss due to interference of the shock wave with a tip clearance leakage (a leakage from a clearance between an airfoil tip and a casing due to a pressure difference between a suction surface and a pressure surface) of the airfoil are generated.

Regarding the influence of the losses due to the shock wave, since a strong shock wave is generated in a tip 101 of an airfoil 100 (airfoil tip) as shown in a static pressure contour in air foil-suction surface of FIG. 15, the efficiency of the tip is lowered as shown in the efficiency distribution in a radial direction of the air foil shown in FIG. 16. As shown in FIG. 17, an incidence angle (an angle difference between an inflow angle and an airfoil leading edge) of a flow decelerated by a detached shock wave 110 as a kind of shock wave with respect to the leading edge 102 of the airfoil 100 increases. When the angle of incidence increases, pressure loss also increases, thereby lowering the efficiency in the axialflow rotary machine.

Regarding various losses due to the shock wave, to suppress the loss due to the interference of the shock wave with the solid wall boundary layer in the rotor airfoil described in Patent Document 1, the interference position of the shock wave in the radial direction of the airfoil with the solid wall boundary layer is designed so that the higher position in the radial direction is upstream in the axial direction. That is, the leading edge in a rotor airfoil section leans forward upstream as a whole so that the higher position in the radial direction is upstream in the axial direction. Accordingly, a secondary flow of the solid wall boundary layer is suppressed and enlargement of the boundary layer before the interference of the shock wave is avoided in order to prevent separation, thereby reducing the loss.

Patent Document 1: Japanese Unexamined Patent Application, First Publication No. H7-224794

DISCLOSURE OF THE INVENTION

Problem to be Solved by the Invention

As described above, in the rotor airfoil described in Patent Document 1, the interference of the secondary flow resulting from the tip leakage with the shock wave is alleviated and the loss of the tip is reduced, by forming the upstream of the rotor airfoil leaning forward. Accordingly, the flow is sent to the tip to enhance the efficiency of the tip, while the boundary layer of the hub (base) is thickened and thus the flow is unstable, thereby reducing the efficiency of the hub.

Means for Solving the Problem

In view of the above-mentioned problems, an object of the invention is to provide a transonic airfoil and an axial flow rotary machine that can suppress the reduction in efficiency due to the shook wave on the tip and avoid enlargement of a boundary layer of a hub, thereby preventing separation.

To accomplish the above-mentioned object, according to an aspect of the present invention, there is provided a transonic airfoil operating in a flow region of a transonic of faster operating fluid, the transonic airfoil including: a hub located dose to a connection position to a rotation shaft; a midportion located at a medium position in a radial direction which is a radial direction of the rotation shaft; a tip located farthest from the rotation shaft in the radial direction; a leading edge located on the upstream of the inflowing operating fluid; and a trailing edge located on the downstream of the operating fluid, wherein sectional profiles stacked in the radial direction of the airfoil are continuously shifted in parallel to a first direction connecting the leading edge and the trailing edge and the sectional profiles close to the tip and the sectional profiles between the midportion and the hub are shifted to the upstream of the first direction to form an S shape, and wherein the shift amount of the sectional profiles close to the tip in the first direction is greater than the shift amount of the sectional profiles between the midportion and the hub in the first direction.

That is, an S shape obtained by combining a forward swept shape in which the tip in the first direction leans to the upstream and a backward swept shape in which the part between the midportion and the hub in the first direction protrudes to the upstream, that is, a shape in which the tip protrudes to the most upstream, is obtained.

At this time, the sectional profiles stacked in the radial direction of the airfoil may be continuously shifted in a second direction perpendicular to the first direction. That is, a forward leant shape in which the tip leans to the upstream may be further combined therewith in the second direction or a backward leant shape in which the part between the midportion and the hub protrudes to the upstream may be combined therewith in the second direction.

An intersection angle of the first direction and an axial direction of the rotation shaft in the sectional profiles stacked in the radial direction of the airfoil may be continuously changed to form a three-dimensional airfoil shape.

According to another aspect of the present invention, there is provided an axial flow rotary machine including: a rotation shaft located at the center and rotating; a plurality of rotor airfoils disposed on the outer peripheral surface of the rotation shaft at equivalent intervals in a circumferential direction and an axial direction of the rotation shaft; a casing covering the rotation shaft and the rotor airfoils; and a plurality of state airfoils disposed on an inner circumferential surface of the casing to alternate with the rotor airfoils in the axial direction of the rotation shaft, wherein the plurality of rotor airfoils partially includes the transonic airfoil according to the above-mentioned aspect.

According to the above-mentioned aspect of the invention, by forming the S shape in which the tip and the part between the hub and the midportion are shifted to the upstream, the boundary layer of the hub can be decreased in thickness to enhance the separation resistance of the hub and the boundary layer of the tip can be increased in thickness to reduce the tip leakage loss. Since the tip protrudes to the upstream, it is possible to weaken the shock wave, thereby suppressing various losses due thereto. Because of the decrease in loss, it is possible to efficiently transmit rotary energy of the airfoil to the fluid. By reducing the separation of the airfoil, it is possible to enhance the stall margin.

DESCRIPTION OF REFERENCE NUMERALS AND SIGNS

1: COMPRESSOR
2: COMBUSTOR
3: TURBINE
4: CASING
5: ROTOR
11, 31: STATOR AIRFOIL
12, 32; ROTOR AIRFOIL
$12a$~$12e$, $12x$, $12y$: TRANSONIC AIRFOIL
121: LEADING EDGE
122: TRAILING EDGE
123: HUB
124: TIP
125: MIDPORTION
126: SUCTION SURFACE
127: PRESSURE SURFACE

BEST MODE FOR CARRYING OUT THE INVENTION

Axial Flow Rotary Machine

Figure 1:
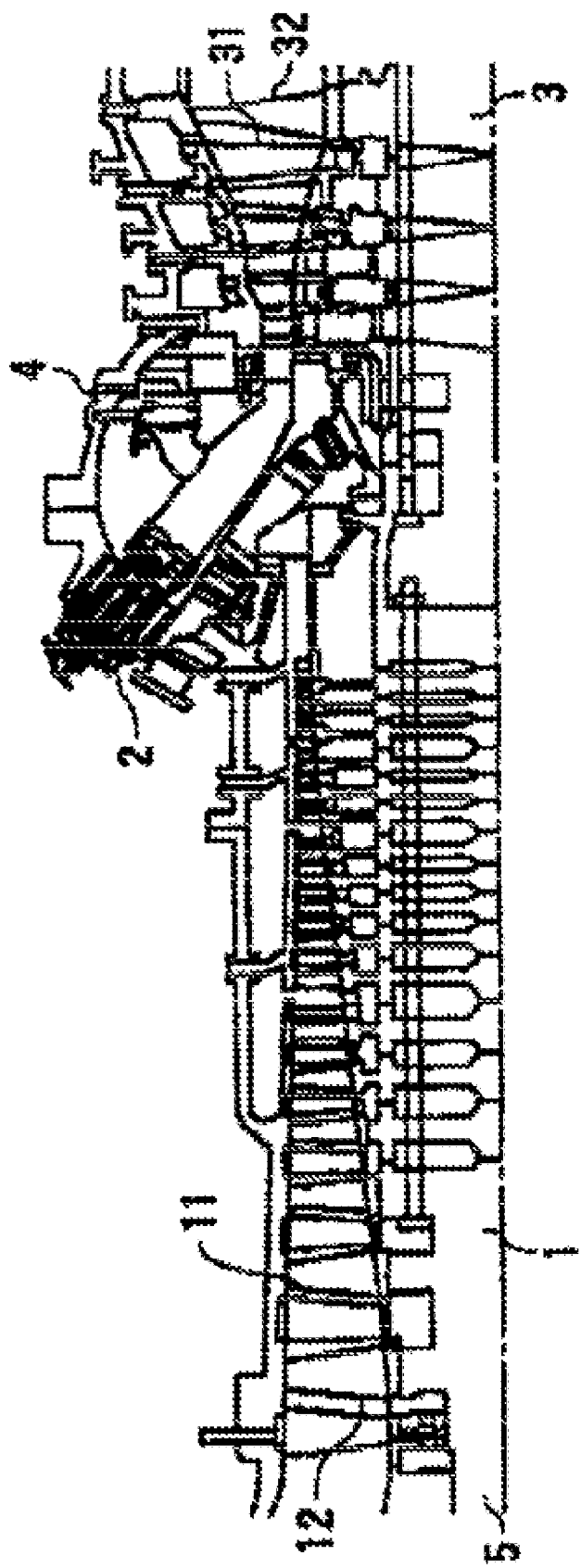
FIG. 1 is a diagram schematically illustrating a gas turbine.

An axial flow rotary machine employing a transonic airfoil as a rotor airfoil will be described now. In the following description, a compressor of a gas turbine is exemplified as the axial flow rotary machine. FIG. 1 is a diagram schematically illustrating a configuration of a gas turbine.

As shown in FIG. 1, a gas turbine includes a compressor 1 compressing air, a combustor 2 being supplied with the sir compressed by the compressor 1 and fuel and perforating a combustion operation, and a turbine 3 rotating by the combustion gas from the combustor 2, The compressor 1, the combustor 2, and the turbine 3 are covered with a casing 4 and plural combustors 2 are arranged at equivalent intervals on the outer circumference of a rotor 5 connecting the compressor 1 and the turbine 3 with one shaft.

In the gas turbine, the air compressed by the compressor 1 is supplied to the combustor 2 or the rotor 5 through the casing 4. The compressed air supplied to the combustor 2 is used to combust the fuel supplied to the combustor 2. The compressed air supplied into the casing 4 close to the turbine 3 and the rotor 5 is used to cool stator airfoils 31 fixed to the casing 4 and rotor airfoils 32 fixed to the rotor 5, which are exposed to a high temperature resulting from the combustion gas from the combustor 2. The stator airfoils 31 and the rotor airfoils 32 are alternately arranged in the axial direction of the rotor 5.

The combustion gas generated in the combustion operation of the combustor 2 is supplied to the turbine 3 and the combustion gas is sprayed to the rotor airfoils 32 and is rectified by the stator airfoils 31, whereby the turbine 3 is rotationally driven. The rotational driving of the turbine 3 is transmitted to the compressor 1 through the rotor 5, whereby the compressor 1 is also rotationally driven. Accordingly, the rotor airfoils 12 fixed to the rotor 5 in the compressor 1 rotates and thus the air flowing in the space formed by the stator airfoils 11 fixed to the casing 4 and the rotor airfoils 12 is compressed. The stator airfoils 11 and the rotor airfoils 12 are alternately arranged in the axial direction of the rotor 5.

In the gas turbine shown in FIG. 1, the compressor 1 is a transonic or supersonic compressor operating by an operating fluid (air) of which the inflowing speed is a transonic speed, that is, a speed equal to or higher than the speed at which a supersonic region with a MACH number greater than 1 is generated in the operating fluid (air) flowing in the rotor airfoils. In the compressor 1 which is the transonic or supersonic compressor, transonic airfoils are used as the rotor airfoils 12.

The transonic airfoil according to the present invention will fee described now. In the following description, the side into which the operating fluid (air) flows in the axial direction of the rotor 5 in the gas turbine shown in FIG. 1 is called an "upstream" and the side from which the operating fluid (air) flows is called a "downstream". In the gas turbine shown in FIG. 1, the radial direction of the rotor 5, that is, the radial direction of the transonic airfoil is called a "span direction." A plane parallel to the flow of the operating fluid in the axial direction of the rotor 5 is called a "meridional plane" and the sectional shape of the transonic airfoil perpendicular to the radial direction of the rotor 5 is called a "sectional profile."

Figure 2:
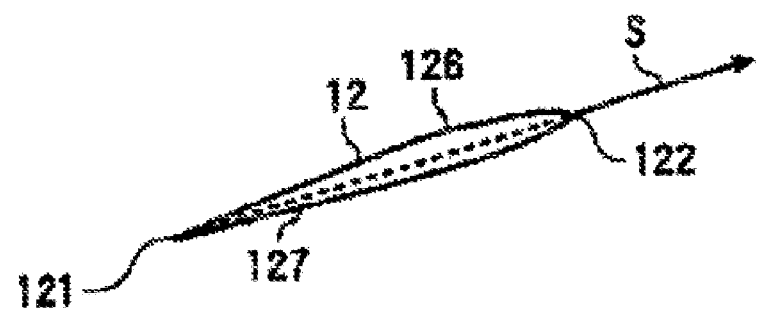
FIG. 2 is a diagram illustrating a sectional profile of a transonic airfoil.

In the transonic airfoil, an operation of stacking the sectional profiles in the span direction is called "stacking." In the sectional profile of the transonic airfoil 12 shown in FIG. 2, an edge on the side into which the operating fluid (air) flows is called a "leading edge" (indicated by reference numeral 121 in FIG. 2), an edge cm the side from which the operating fluid (air) flows is called a "trailing edge" (indicated by reference numeral 122 in FIG. 2), and an oblique direction of a straight line connecting the leading edge and the trailing edge about the shaft of the rotor 5 is called a "stagger direction" (indicated by arrow S in FIG. 2). The surface facing the upstream in the axial direction of the rotor 5 is called a "suction surface" (indicated by reference numeral 126 in FIG. 2) and the surface facing the downstream in the axial direction of the rotor 5 is called a "pressure surface" (indicated by reference numeral 127 in FIG. 2).

Figure 3:
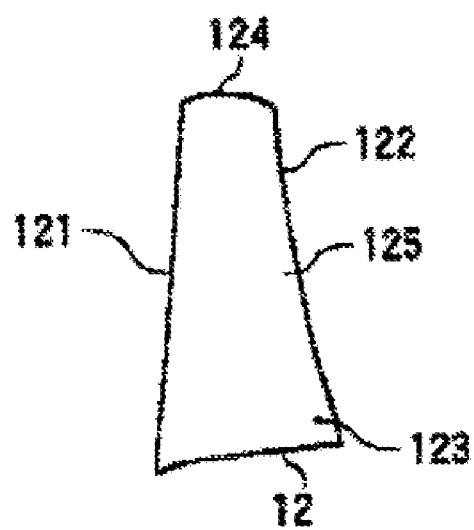
FIG. 3 is a sectional view illustrating a configuration of the transonic airfoil in a meridional plane.

In the section in the span direction of the transonic airfoil 12 shown in FIG. 3, the position (corresponding to 80% to 100% in the radial direction of the transonic airfoil 12) connected to the rotor 5 is called a "hub" (indicated by reference numeral 123 of FIG. 3), the edge position (corresponding to 0% to 20% in the radial direction of the transonic airfoil 12) close to the casing 4 is called a "tip" (indicated by reference numeral 124 of FIG. 3), and the center position (corresponding to the vicinity of 50% in the radial direction of the transonic airfoil 12) in the airfoil height is sailed a "midportion" (indicated by reference numeral 125 of FIG. 3). The positions in the radial direction of the transonic airfoil 12 are expressed by percentage, but the percentage expression indicates the positions in the radial direction of the rotor 5 (corresponding to the radial direction of the transonic airfoil 12) as positions relative to the height of the transonic airfoil 12. The edge most apart from the outer circumferential surface of the rotor 5 is expressed at 0% and the position connected to the outer circumferential surface of the rotor 5 is expressed at 100%.

Figure 4A:
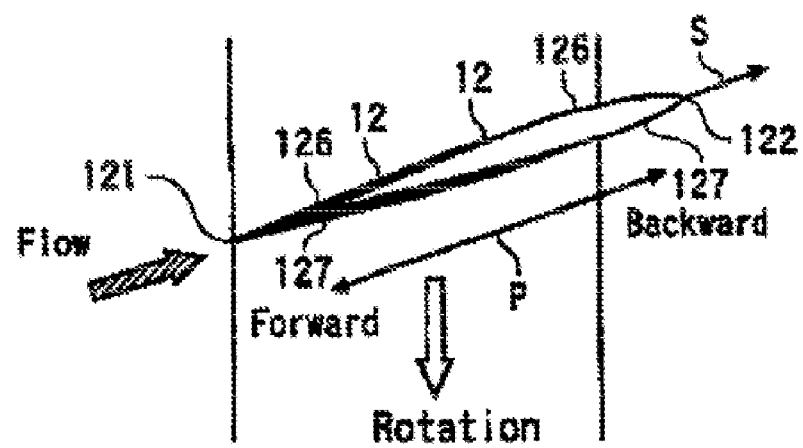
FIG. 4A is a diagram illustrating a sweep direction as a direction in which the center of the sectional profile of the transonic airfoil is shifted.
Figure 4B:
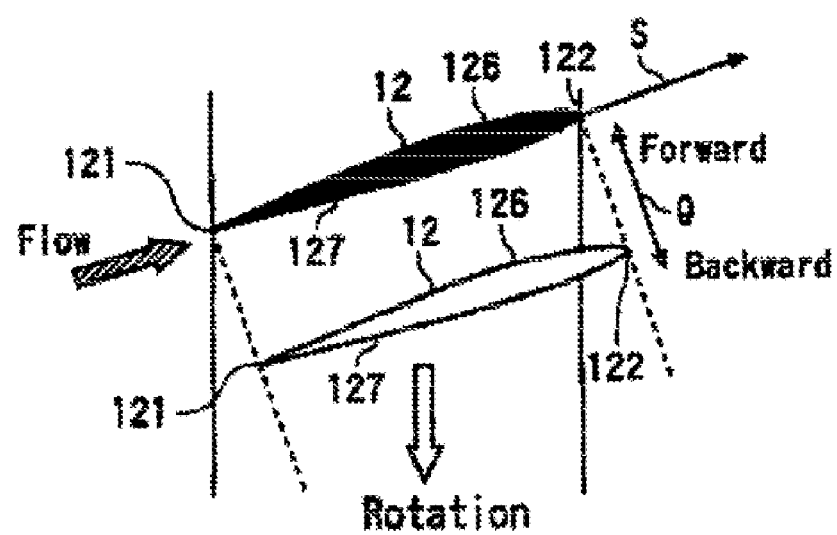
FIG. 4B is a diagram illustrating a lean direction as a direction in which the center of the sectional profile of the transonic airfoil is shifted.

In the sectional profile of the transonic airfoil 12, as shown in FIG. 4A, a shift direction (indicated by arrow P) is called a "sweep direction" when the sectional profile is shifted parallel to the stagger direction (indicated by arrow S) and as shown in FIG. 4B, a shift direction (indicated by arrow Q) is called a "lean direction" when the sectional profile is shifted perpendicular to the stagger direction.

Basic Configuration of Transonic Airfoil

A baste configuration of the transonic airfoil according to the present invention will be described with reference to the accompanying drawings. In the basic configuration, the center positions of the sectional profiles of the transonic airfoil in the span direction are continuously changed in the sweep direction. Configurations of three kinds of transonic airfoils 12a to 12c in which the center positions of the sectional profiles arc continuously changed in the sweep direction from the hub 123 to the tip 124 in the span direction are shown in FIGS. 5A to 5C.

Figure 5A:
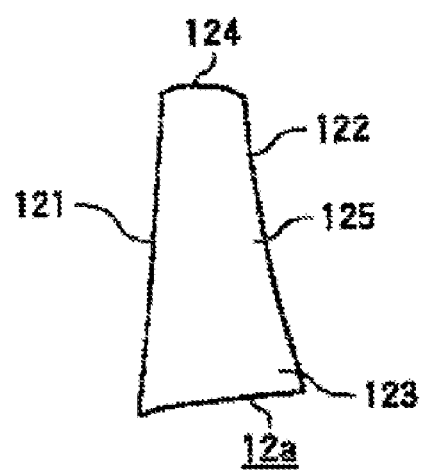
FIG. 5A is a diagram illustrating a basic configuration of the transonic airfoil according to the present invention.

A transonic airfoil 12a shown in FIG. 5A has a configuration in which the centers of gravity G of the sectional profiles from the hub 123 to the tip 124 are parallel to the span direction. That is, the center of gravity G of the each sectional profile is constant in the radial direction of file rotor 5, and the configuration shown in FIG. 5A is used as a reference. This shape of the transonic airfoil 12a is called a "reference shape" in the following description.

Figure 5B:
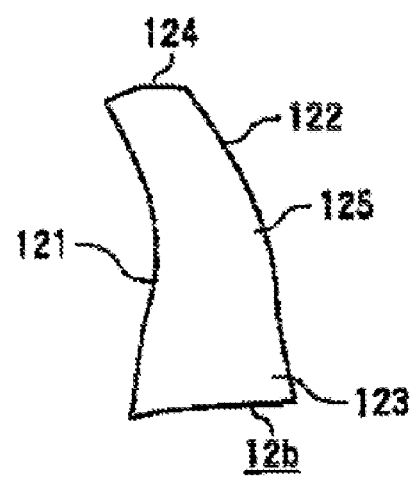
FIG. 5B is a diagram illustrating a basic configuration of the transonic airfoil according to the present invention.

A transonic airfoil 12b shown, in FIG. 5B has a configuration, in which the center of gravity G of the each sectional profile from the hub 123 to the tip 124 is continuously shifted from the downstream to the upstream in the sweep direction. That is, compared with the transonic airfoil 12a shown in FIG. 5A, the upstream (the leading edge 121) leans forward relative to the radial direction of the rotor 5. This shape of the transonic airfoil 12b is called a "forward swept shape" in the following description.

Figure 5C:
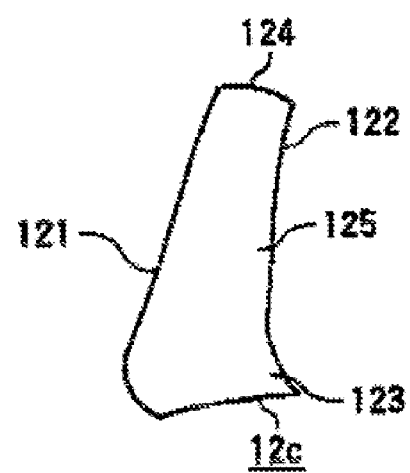
FIG. 5C is a diagram illustrating a basic configuration of the transonic airfoil according to the present invention.

A transonic airfoil 12c shown in FIG. 5C has a configuration in which the center of gravity G of the each sectional profile from the tip 124 to the hub 123 is continuously shifted from the downstream to the upstream in the sweep direction. That is, compared with the transonic airfoil 12a shown in FIG. 5A, the downstream (the trailing edge 122) leans backward relative to the radial direction of the rotor 5 and the hub 123 protrudes to the upstream (the leading edge 121). This shape of the transonic airfoil 12c is called a "backward swept shape" in the following description.

Figure 6:
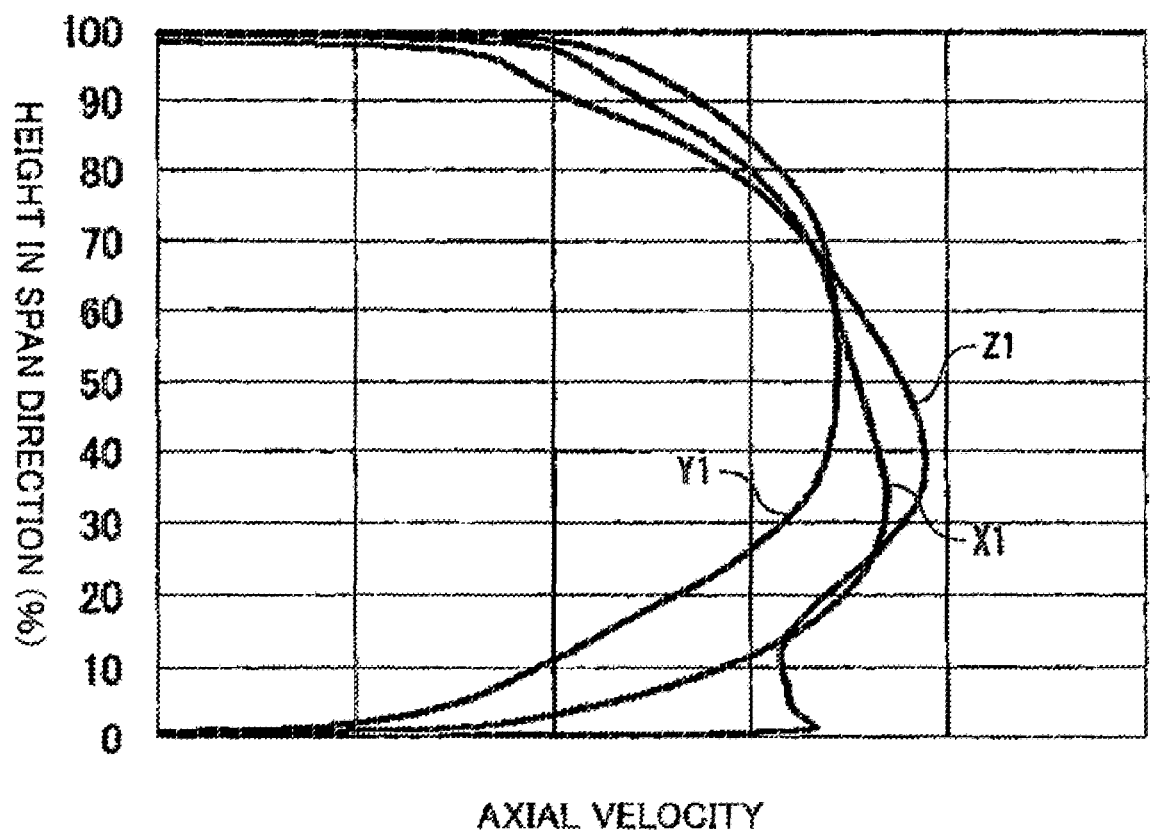
FIG. 6 is a diagram illustrating an axial velocity distribution in the span direction of the transonic airfoils shown in FIGS. 5A to 5C.

Axial velocity (the speed of the operating fluid flowing into the leading edge 121) distributions in the span direction of the transonic airfoils 12a to 12c shown in FIGS. 5A to 5C are represented by the curves X1 to Z1 in FIG. 6. In the axial velocity distributions in the span direction, when the transonic airfoil 12a having the reference shape shown in FIG. 5A is compared with the transonic airfoil 12b having the forward swept shape shown in FIG. 5B, the axial velocity of the tip 124 is higher but the axial velocity of the hub 123 is lower in the curve Y1 of the transonic airfoil 12b man in the curve X1 of the transonic airfoil 12a. On the other hand, when the transonic airfoil 12a having the reference shape shown in FIG. 5A is compared with the transonic airfoil 12c having the backward swept shape shown in FIG. 5C, the axial velocity of the tip 124 is lower but the axial velocity of the hub 123 is higher in the curve Z1 of the transonic airfoil 12c than in the curve X1 of the transonic airfoil 12a.

As can be seen from the curves X1 to Z1 shown in FIG. 6, the flow of the operating fluid (air) is gathered in the tip 124 in the forward swept shape in which the tip 124 is leaned forward as shown in the transonic airfoil 12b of FIG. 5B. On the other hand, the flow of the operating fluid (air) is gathered in the hub 123 in the backward swept shape, in which the tip 124 is leaned backward as shown in the transonic airfoil 12c of FIG. 5C.

Figure 7:
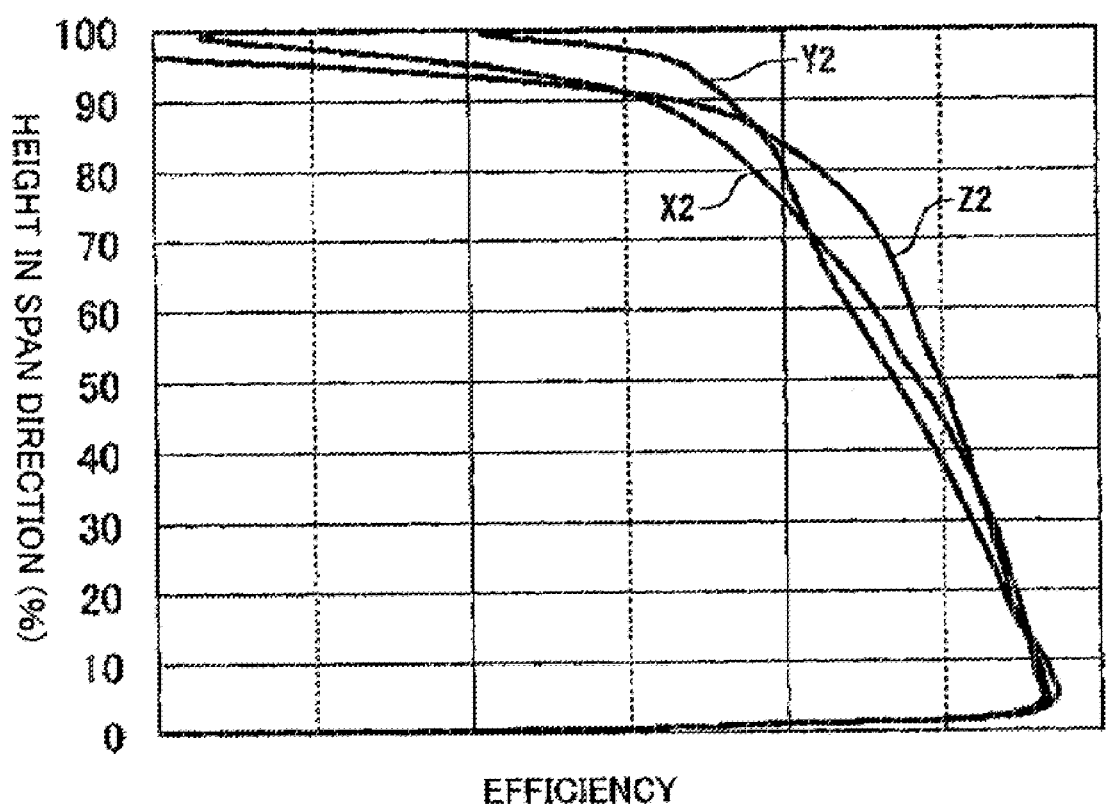
FIG. 7 is a diagram illustrating an efficiency distribution in the span direction of the transonic airfoils shown in FIGS. 5A to 5C.

Efficiency (energy efficiency with which the rotary power of the transonic airfoil is transmitted to the operating fluid) distributions in the span direction of the transonic airfoils 12a to 12c shown in FIGS. 5A to 5C are represented by the curves X2 to Z2 of FIG. 7. In the efficiency distributions in the span direction, when the transonic airfoil 12a having the reference shape shown in FIG. 5A is compared with the transonic airfoil 12b having the forward swept shape shown in FIG. 5B, the efficiency of the tip 124 is higher but the efficiency of the hub 123 is lower in the curve Y2 of the transonic airfoil 12b than in the curve X2 of the transonic airfoil 12a. On the other hand, when the transonic airfoil 12a having the reference shape shown in FIG. 5A is compared with the transonic airfoil 12c having the forward swept shape shown in FIG. 5C, the efficiency of the tip 124 is lower but the efficiency of portions other than fee vicinity of the tip 124 is the same or higher in the curve 72 of the transonic airfoil 12c than in the curve X2 of the transonic airfoil 12a.

As can be seen from the curves X2 to Z2 shown in FIG. 7, in the forward swept shape in which the tip 124 is leaned forward as shown in the transonic airfoil 12b of FIG. 5B, the static pressure difference between the suction surface 126 and the pressure surface 127 in the leading edge 121 of the tip 124, which occupies 70% or more of the airfoil height in the span direction, is reduced. On the other hand, in the backward swept shape in which the tip 124 is leaned backward as shown in the transonic airfoil 12c of FIG. 5C, the static pressure difference between the suction surface 126 and the pressure surface 127 in the leading edge 121 of the hub 123, which occupies 70% or less of the airfoil height in the span direction, is reduced.

Figure 8:
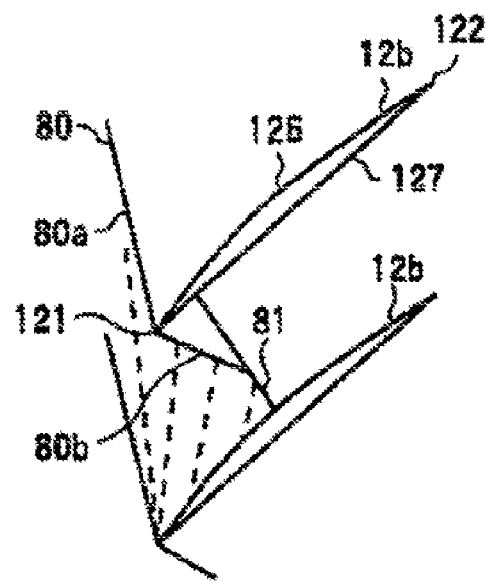
FIG. 8 is a diagram illustrating a shock wave structure in the transonic airfoils arranged in a circumferential direction of a rotor and shown in FIG. 5B.

In the forward swept shape shown in FIG. 5B, oblique shock waves 80a and 80b colliding with the leading edge 121 of the tip 124 are generated to the suction surface 126 and the pressure surface 127, like the sectional profiles close to the tip 124 of the plural transonic airfoils 12b arranged in the circumferential direction of the rotor 5 shown in FIG. 8. The flow of the operating fluid (air) is decelerated by the oblique shock wave 80b generated on the pressure surface 127 of the tip 124 and thus a passage shock wave 81 generated between the adjacent transonic airfoils 12b is weakened.

In view of this fact, by employing the forward swept shape shown in FIG. 5B, the flow of the operating fluid (air) can be sent to the tip 124 to improve the matching of the leading edge 121 and to weaken the shock wave. Accordingly, it is possible to reduce the loss due to the shook wave itself, the loss due to the interference of the shock wave with the solid wall boundary layer, and the loss due to the interference of the shock wave with the tip clearance leakage in the tip 124.

On the other hand, by employing the backward swept shape shown in FIG. 5C, the operating fluid (air) is sent to the hub 123 to improve the matching of the leading edge 121 other than the tip 124. Here, "to improve the matching" means that the inflow angle of the operating fluid into the airfoil becomes a proper value relative to an airfoil metal angle and thus the loss due to the airfoil becomes the minimum or close to the minimum. Accordingly, the solid wall boundary layer of the hub 123 can be reduced in thickness to enhance separation resistance. Therefore, it is possible to reduce loss due to the interference of the shock wave with the solid wall boundary layer on the hub 123.

In this way, by adjusting the sectional profiles, which are stacked in the span direction, in the sweep direction, it is possible to control a three-dimensional pressure field of the downstream of the shock wave and to change the axial velocity profile of the leading edge 121. Accordingly, the angle of incidence can be adjusted to reduce the profile loss and the flow can be sent to the trailing edge 122 to suppress the development of the boundary layer. Therefore, it is possible to reduce the separation of the hub of the stator airfoil 11, which faces the rotor airfoil 12 as the transonic airfoil, close to the casing 4 and to enhance the stall margin. As described above, it is possible to suppress various losses due to the shock wave at the positions in the span direction of the rotor airfoil 12 employing the transonic airfoil, and to enhance the efficiency.

Examples of the transonic airfoils obtained by stacking the sectional profiles, which are adjusted in the sweep direction, in the span direction will be described now.

FIRST EMBODIMENT

Figure 9:
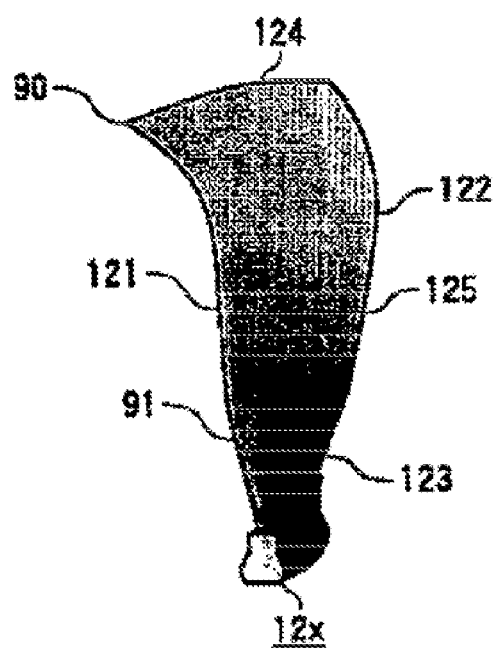
FIG. 9 is a perspective view schematically illustrating a configuration of a transonic airfoil according to a first embodiment of the present invention.
Figure 10:
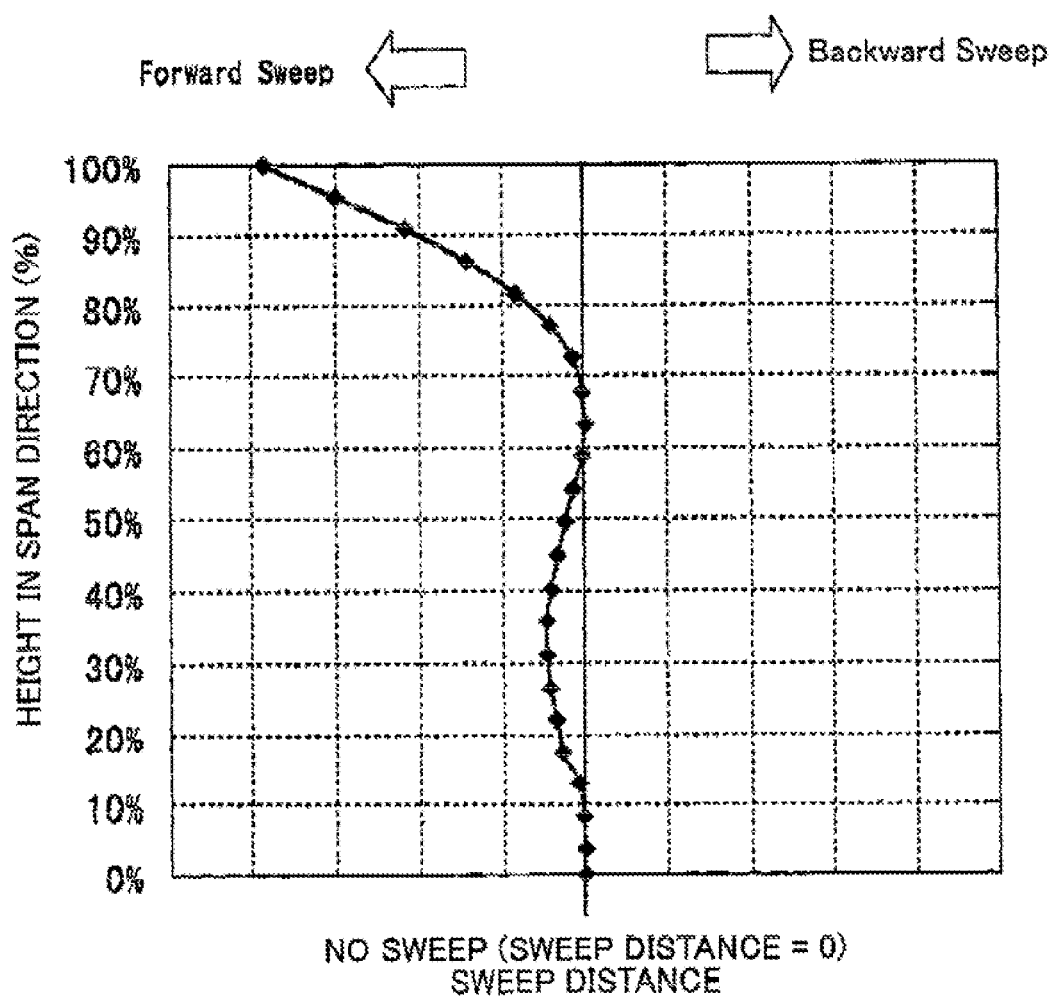
FIG. 10 is a diagram illustrating a shift in a sweep direction of sectional profiles in the span direction of the transonic airfoil shown in FIG. 9.

A transonic airfoil according to a first embodiment in which the sectional profiles in the span direction are adjusted in the sweep direction will be described with reference to the drawings on the basis of the above-mentioned basic configuration. FIG. 9 is a perspective view schematically illustrating a configuration of a transonic airfoil according to the present embodiment. FIG. 10 is a diagram illustrating the shift in the sweep direction of the sectional profiles in the span direction from the hub to the tip.

As shown in FIG. 9, a transonic airfoil 12x according to the present embodiment has a shape obtained by combining the forward swept shape of the transonic airfoil 12b shown in FIG. 5B with the backward swept shape of the transonic airfoil 12c shown in FIG. 5C. That is, the transonic airfoil 12x shown in FIG. 9 has a shape in which the sectional profiles close to the tip 124 are shifted to protrude to the upstream in the sweep direction, similarly to the forward swept shape of the transonic airfoil 12b shown in FIG. 5B. Similarly to the backward swept shape of the transonic airfoil 12c shown in FIG. 5C, the sectional profiles of the part between the hub 123 and the midportion 125 are also shifted to protrude to the upstream in the sweep direction.

In this way, by employing the configuration in which the sectional profiles are adjusted in position in the sweep direction, the transonic airfoil 12x shown in FIG. 9 has an S shape in the span direction. The adjusted the position in the sweep direction which is continuously shifted in the span direction is shown in FIG. 10. As shown in FIG. 10, in the transonic airfoil 12x shown in FIG. 9, the protruding portion 90 protruding to the upstream in the sweep direction in the tip 124 (position corresponding to 100% in the span direction) more protrudes to the upstream in the sweep direction than the protruding portion 91 protruding to the upstream in the sweep direction in the part (position corresponding to 20% to 50% in the span direction) between the hub 123 and the midportion 125, whereby the S shape is formed.

In this way, by forming the S shape obtained by combining the forward swept shape with the backward swept shape, it is possible to reduce fee thickness of the boundary layer of the hub 123, to enhance the separation resistance of the hub 123, and to reduce pressure loss by optimizing the shock wave structure of the tip 124.

Figure 11A:
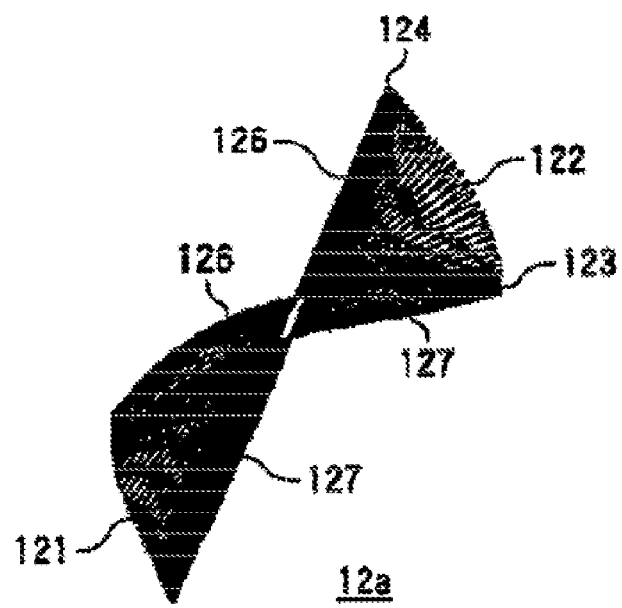
FIG. 11A is a surface diagram illustrating a transonic airfoil having a reference shape as viewed from a tip thereof.
Figure 11B:
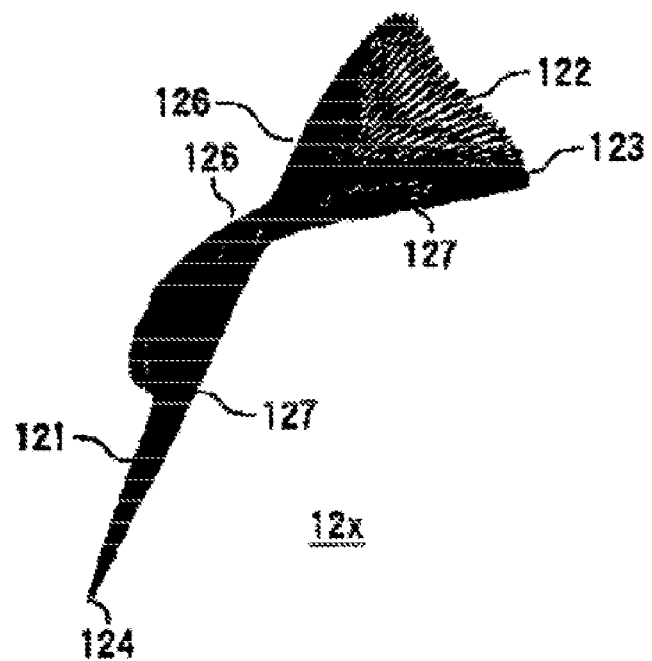
FIG. 11B is a surface diagram illustrating the transonic airfoil shown in FIG. 9 as viewed from a tip thereof.
Figure 12A:
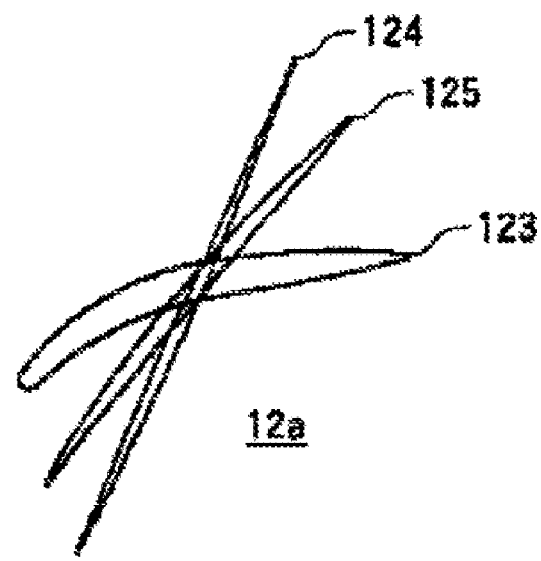
FIG. 12A is a diagram illustrating the sectional profiles of a hub, a midportion, and a tip of the transonic airfoil having the reference shape.
Figure 12B:
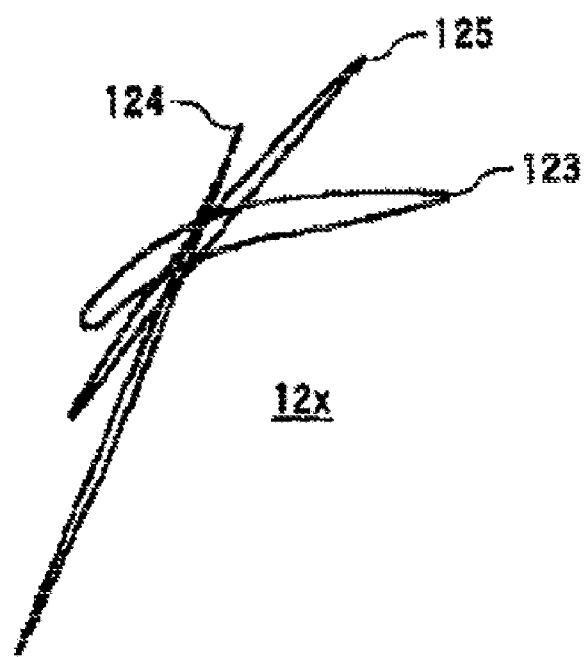
FIG. 12B is a diagram illustrating the sectional profiles of a hub, a midportion, and a tip of the transonic airfoil shown in FIG. 9.

In addition, since the transonic airfoil 12x has a three-dimensional airfoil shape capable of reducing the profile loss, the stagger direction of the sectional profiles is changed in the span direction. The top views of the change of the stagger direction of the sectional profiles as viewed from the tip of the transonic airfoil are shown in FIGS. 11A and 11B. FIG. 11B is a top view of the transonic airfoil 12x according to this embodiment and FIG. 11A shows the transonic airfoil 12a having the reference shape with no displacement in the sweep direction for the purpose of the easy understanding, which is compared with the transonic airfoil 12x. For the purpose of the easy understanding, the sectional profiles of the hub 123, the midportion 125, and the tip 124 of the transonic airfoils 12a and 12x are shown in FIGS. 12A and 12B, respectively.

As shown in FIGS. 11A, 11B, 12A, and 12B, in both the transonic airfoils 12a and 12x, the stagger direction is determined so that the tip 124 becomes almost perpendicular to the axial direction of the rotor 5 and the stagger direction is determined so that the hub 123 becomes almost parallel to the axial direction of the rotor 5. The stagger direction of the sectional profiles is determined so that the stagger direction is continuously changed from the hub 123 to the tip 124. That is, in both the transonic airfoils 12a and 12x, the angle of the stagger direction of the midportion 125 about the axial direction of the rotor 5 is a middle value of the angles of the stagger directions of the tip 124 and the hub 123 about the axial direction of the rotor 5.

Second Embodiment

A transonic airfoil according to a second embodiment in which the sectional profiles in the span direction are adjusted in the sweep direction will be described with reference to the drawings on the basis of the above-mentioned basic configuration. In the present embodiment, similarly to the transonic airfoil according to the first embodiment, in addition to the configuration in which the sectional profiles in the span direction are adjusted in the sweep direction, the positions of the sectional profiles are changed in the lean direction and the sectional profiles are stacked.

That is, in the transonic airfoil 12y according to the present embodiment, similarly to the transonic airfoil 12x according to the first embodiment, the sectional profiles in the span direction from the hub to the tip are shifted in the sweep direction so that the tip 124 has the forward swept shape and the hub 123 has the backward swept shape. In addition, the sectional profiles in the span direction from the hub to the tip are also shifted in the lean direction.

Figure 13A:
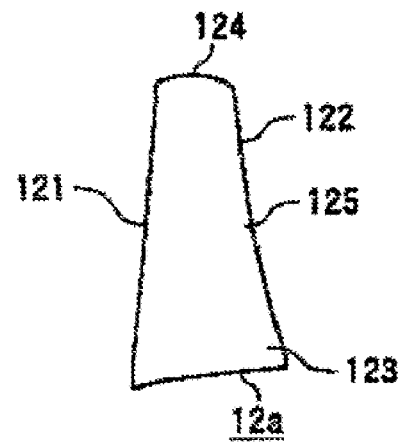
FIG. 13A is a diagram illustrating a configuration of the transonic airfoil in which the positions of the sectional profiles are changed in a lean direction.
Figure 13B:
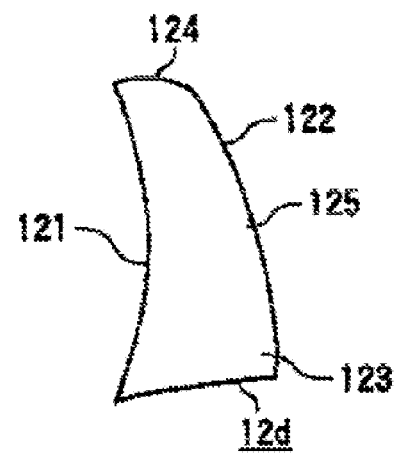
FIG. 13B is a diagram illustrating a configuration of the transonic airfoil in which the positions of the sectional profiles are changed in a lean direction.
Figure 13C:
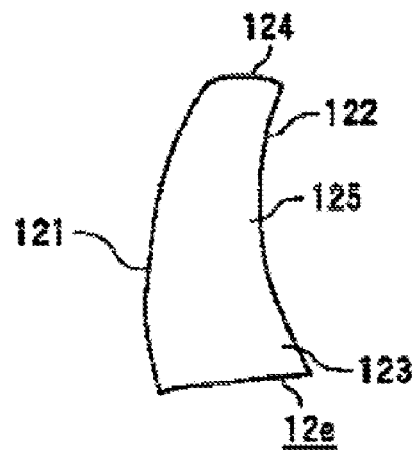
FIG. 13C is a diagram illustrating a configuration of the transonic airfoil in which the positions of the sectional profiles are changed in a lean direction.

The transonic airfoil of which the positions of the sectional profiles are changed in the lean direction will be described in brief with reference to FIGS. 13A to 13C. FIGS. 13A to 13C show configurations of three kinds of transonic airfoils 12a, 12d, and 12e in which the sectional profiles from the hub 123 to the tip 124 in the span direction are continuously changed in the lean direction. The transonic airfoil 12a shown in FIG. 13A is a transonic airfoil having the "reference shape" shown in FIG. 5A.

The transonic airfoil 12d shown in FIG. 13B has a configuration in which the center of gravity G of the each sectional profile from the hub 123 to the tip 124 is continuously shifted from the downstream (the pressure surface 127) to the upstream (the suction surface 126) in the lean direction. That is, compared with the transonic airfoil 12a shown in FIG. 13A, the upstream (the leading edge 121) in the radial direction of the rotor 5 is leaned forward. The shape of the transonic airfoil 12d is called a "forward leant shape" in the following description.

The transonic airfoil 12e shown in FIG. 13C has a configuration in which the center of gravity G of the each sectional profile from the tip 124 to the hub 123 are continuously shifted from the downstream (the pressure surface 127) to the upstream (the suction surface 126) in the lean direction. That is, compared with the transonic airfoil 12a shown in FIG. 13A, the downstream (the trailing edge 122) in the radial direction of the rotor 5 is leaned backward and the hub 123 protrudes to the upstream (the leading edge 121). The shape of the transonic airfoil 12e is called a "backward leant shape" in the following description.

Therefore, in the transonic airfoil 12y according to the present embodiment, similarly to the first embodiment, the forward leant shape of the transonic airfoil 12d shown in FIG. 13B and the backward leant shape of the transonic airfoil 12e shown in FIG. 13C are combined in addition to the S shape in which the forward swept shape of the transonic airfoil 12b shown in FIG. 5B and the backward swept shape of the transonic airfoil 12c shown in FIG. 5C are combined. Accordingly, compared with the transonic airfoil 12x according to the first embodiment, the degree of freedom in adjustment of the axial velocity profile or the matching increases, thereby improving the aerodynamic performance.

Figure 14:
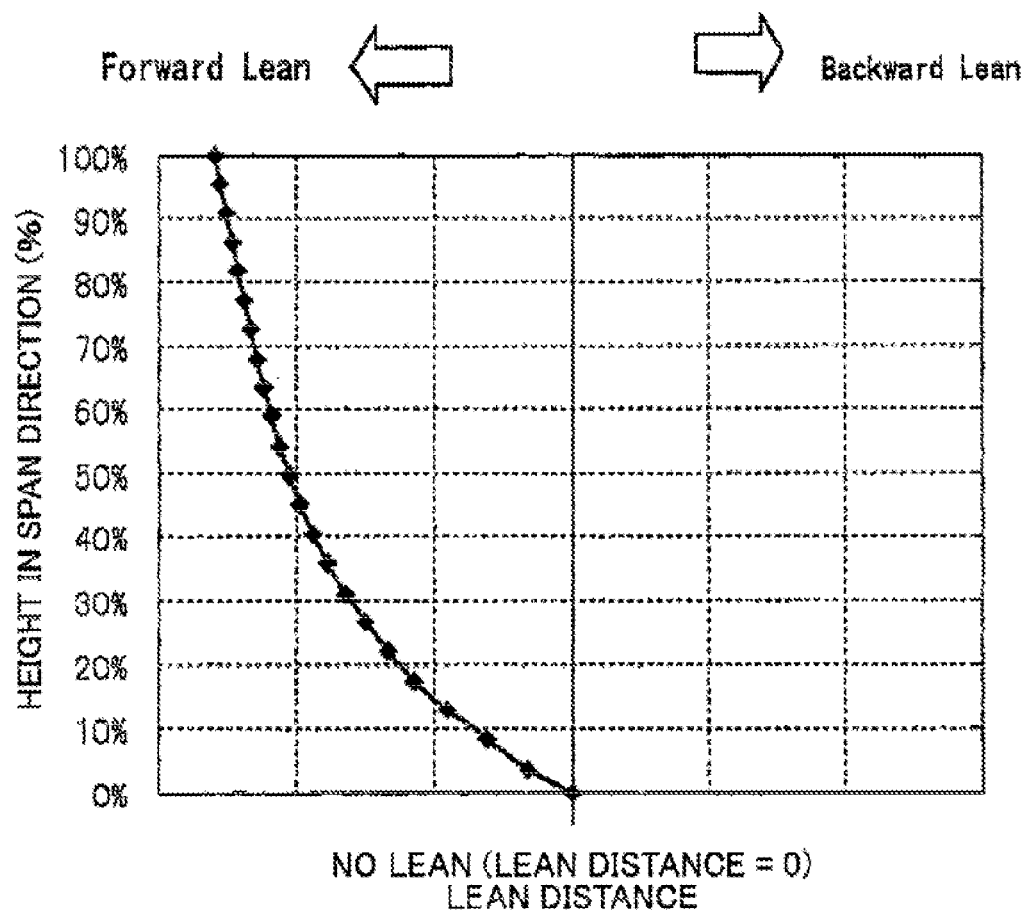
FIG. 14 is a diagram illustrating a shift in the lean direction of the sectional profiles in the span direction of a transonic airfoil according to a second embodiment of the present invention.
Figure 15:
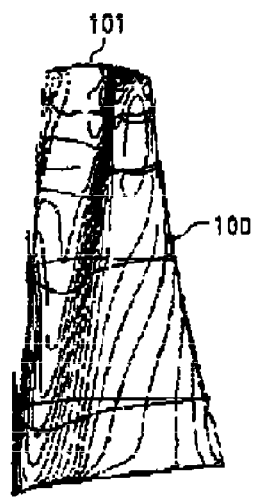
FIG. 15 is a diagram illustrating a static pressure contour in air foil-suction surface in a conventional airfoil.
Figure 16:
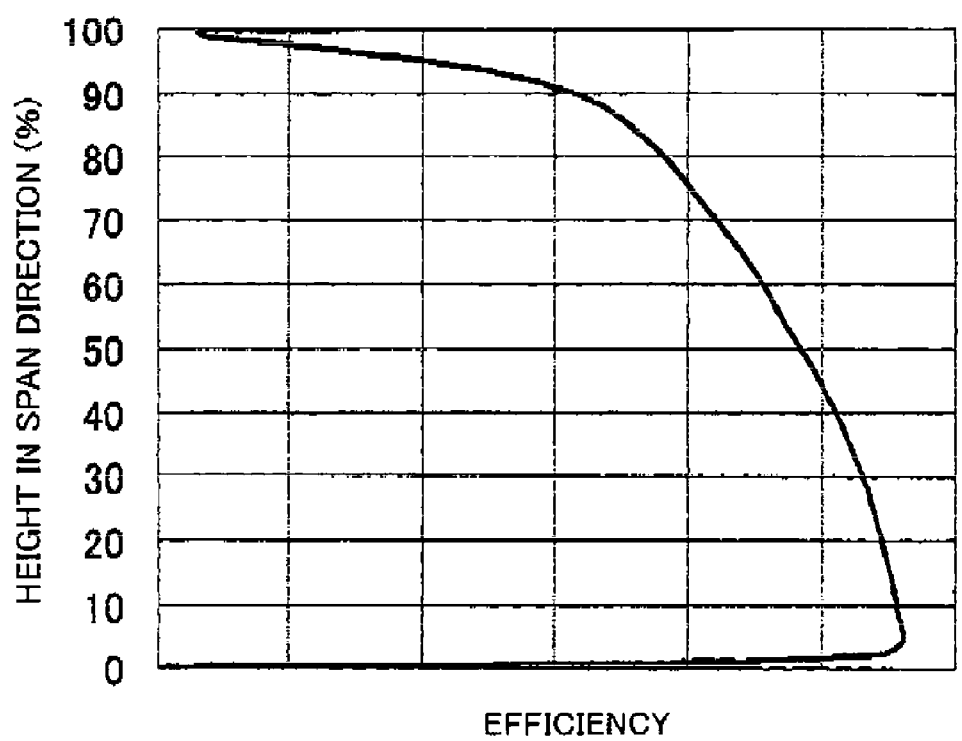
FIG. 16 is a diagram illustrating an efficiency distribution in the span direction of the conventional airfoil.
Figure 17:
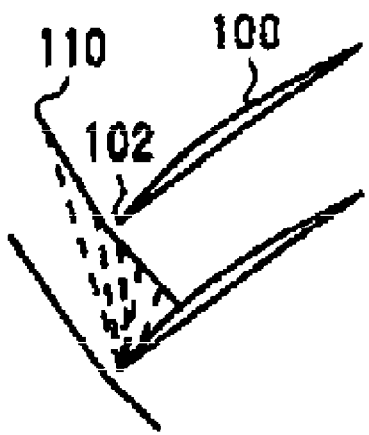
FIG. 17 is a diagram illustrating a shock wave structure in the conventional airfoils arranged in the circumferential direction of the rotor.

FIG. 14 shows a shifted state in the lean direction of the sectional profiles in the span direction from the hub to the tip when the forward lean is combined. As shown in FIG. 14, when the forward leant shape is combined with the S shape formed by the forward swept shape and the backward swept shape, the shift amount of the upstream (the suction surface 126) slowly increases from the hub 123 to the tip 124, the variation rate in shift amount is high in the hub 123 and low in the tip 124.

INDUSTRIAL APPLICABILITY

The present invention can be applied to a transonic airfoil used in the atmosphere of a transonic or supersonic operating fluid. The invention can be also applied to an axial flow rotary machine having the transonic airfoil as a rotor airfoil. The axial flow rotary machine can be applied to compressors of a gas turbine, an aircraft fan engine, and an aircraft jet engine.

The invention claimed is:

1. A transonic airfoil operating in a flow region of a transonic or faster operating fluid, the transonic airfoil comprising:
    a hub located close to a connection position to a rotation shaft;
    a midportion located at a medium position in a radial direction which is a radial direction of the rotation shaft;
    a tip located farthest from the rotation shaft in the radial direction;
    a leading edge located on an upstream of the inflowing operating fluid; and
    a trailing edge located on a downstream of the operating fluid; wherein
    sectional profiles stacked in the radial direction of the airfoil are continuously shifted in parallel to a first direction connecting the leading edge and the trailing edge, further wherein
    the sectional profiles close to the tip and the sectional profiles between the midportion and the hub are shifted to the upstream of the first direction to form an S shape, and
    the shift amount of the sectional profiles close to the tip in the first direction is greater than the shift amount of the sectional profiles between the midportion and the hub in the first direction.

2. The transonic airfoil according to claim 1, wherein an intersection angle of the first direction and an axial direction of the rotation shaft in the sectional profiles stacked in the radial direction of the transonic airfoil is continuously changed.

3. The transonic airfoil according to claim 1, wherein the sectional profiles stacked in the radial direction of the airfoil are continuously shifted in a second direction which is perpendicular to the first direction.

4. The transonic airfoil according to claim 3, wherein an intersection angle of the first direction and the axial direction of the rotation shaft in the sectional profiles stacked in the radial direction of the transonic airfoil is continuously changed.

5. An axial flow rotary machine comprising:
a rotation shaft located at the center and rotating;
a plurality of rotor airfoils disposed on the outer peripheral surface of the rotation shaft at equivalent intervals in a circumferential direction and an axial direction of the rotation shaft;
a casing covering the rotation shaft and the rotor airfoils; and
a plurality of stator airfoils disposed on an inner circumferential surface of the casing to alternate with the rotor airfoils in the axial direction of the rotation shaft, wherein
the plurality of rotor airfoils partially includes the transonic airfoil according to claim 1.

6. An axial flow rotary machine comprising:
a rotation shaft located at the center and rotating;
a plurality of rotor airfoils disposed on the outer peripheral surface of the rotation shaft at equivalent intervals in a circumferential direction and an axial direction of the rotation shaft;
a casing covering the rotation shaft and the rotor airfoils; and
a plurality of stator airfoils disposed on an inner circumferential surface of the casing to alternate with the rotor airfoils in the axial direction of the rotation shaft, wherein
the plurality of rotor airfoils partially includes the transonic airfoil according to claim 2.

7. An axial flow rotary machine comprising:
a rotation shaft located at the center and rotating;
a plurality of rotor airfoils disposed on the outer peripheral surface of the rotation shaft at equivalent intervals in a circumferential direction and an axial direction of the rotation shaft;
a casing covering the rotation shaft and the rotor airfoils; and
a plurality of stator airfoils disposed on an inner circumferential surface of the casing to alternate with the rotor airfoils in the axial direction of the rotation shaft, wherein
the plurality of rotor airfoils partially includes the transonic airfoil according to claim 3.

8. An axial flow rotary machine comprising:
a rotation shaft located at the center and rotating;
a plurality of rotor airfoils disposed on the outer peripheral surface of the rotation shaft at equivalent intervals in a circumferential direction and an axial direction of the rotation shaft;
a casing covering the rotation shaft and the rotor airfoils; and
a plurality of stator airfoils disposed on an inner circumferential surface of the casing to alternate with the rotor airfoils in the axial direction of the rotation shaft, wherein
the plurality of rotor airfoils partially includes the transonic airfoil according to claim 4.

* * * * *